United States Patent [19]

Ratliff

[11] 4,043,569
[45] Aug. 23, 1977

[54] TRANSPORT VEHICLE
[75] Inventor: Roger D. Ratliff, Irving, Tex.
[73] Assignee: PepsiCo Inc., Purchase, N.Y.
[21] Appl. No.: 671,139
[22] Filed: Mar. 29, 1976
[51] Int. Cl.² .......................................... E62D 53/00
[52] U.S. Cl. .............................. 280/423 R; 296/28 J; 280/415 B
[58] Field of Search ................ 296/28 J, 28 L, 28 R, 296/33, 34, 42, 40; 280/423 R

[56] References Cited
U.S. PATENT DOCUMENTS

| 2,390,606 | 12/1945 | McCurdy | 296/33 |
| 2,715,040 | 8/1955 | Rhoads | 296/24 R |
| 3,733,089 | 5/1973 | Goecke | 280/423 R |
| 3,800,966 | 4/1974 | Newton | 280/423 R |

FOREIGN PATENT DOCUMENTS

| 1,025,432 | 1/1953 | France | 296/28 J |

Primary Examiner—Philip Goodman
Attorney, Agent, or Firm—Scully, Scott, Murphy & Presser

[57] ABSTRACT

A transport vehicle providing for a light-weight frame structure including a plurality of transversely extending, longitudinally spaced divider members for supporting bulk cargo in individual bays, and with the loads and stresses being dispersed throughout the frame structure. The frame structure extends into a goose-neck connection for a tractive vehicle.

9 Claims, 7 Drawing Figures

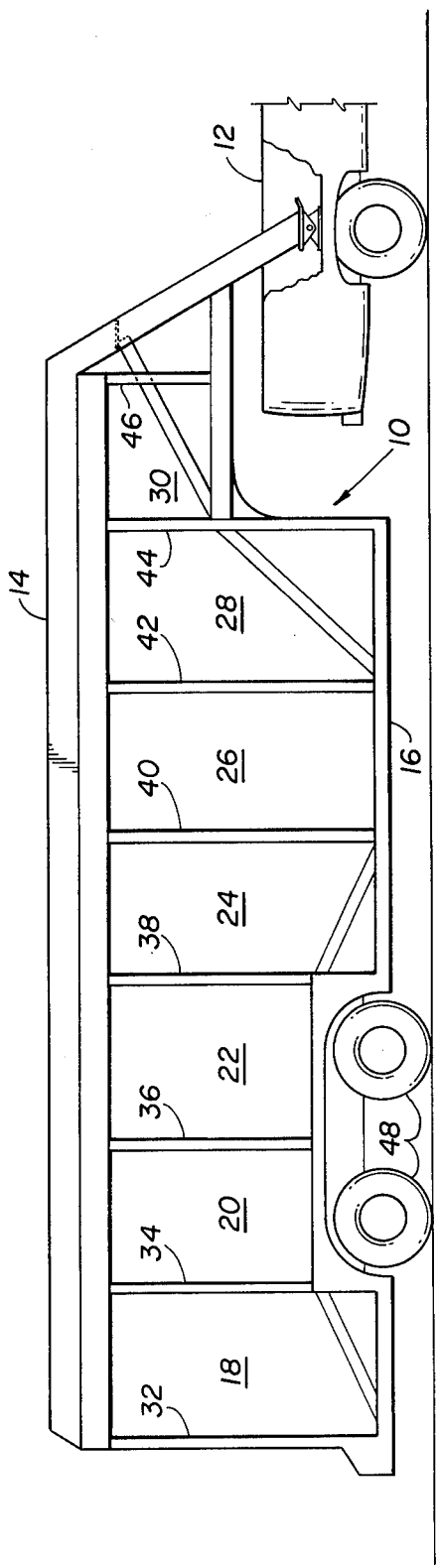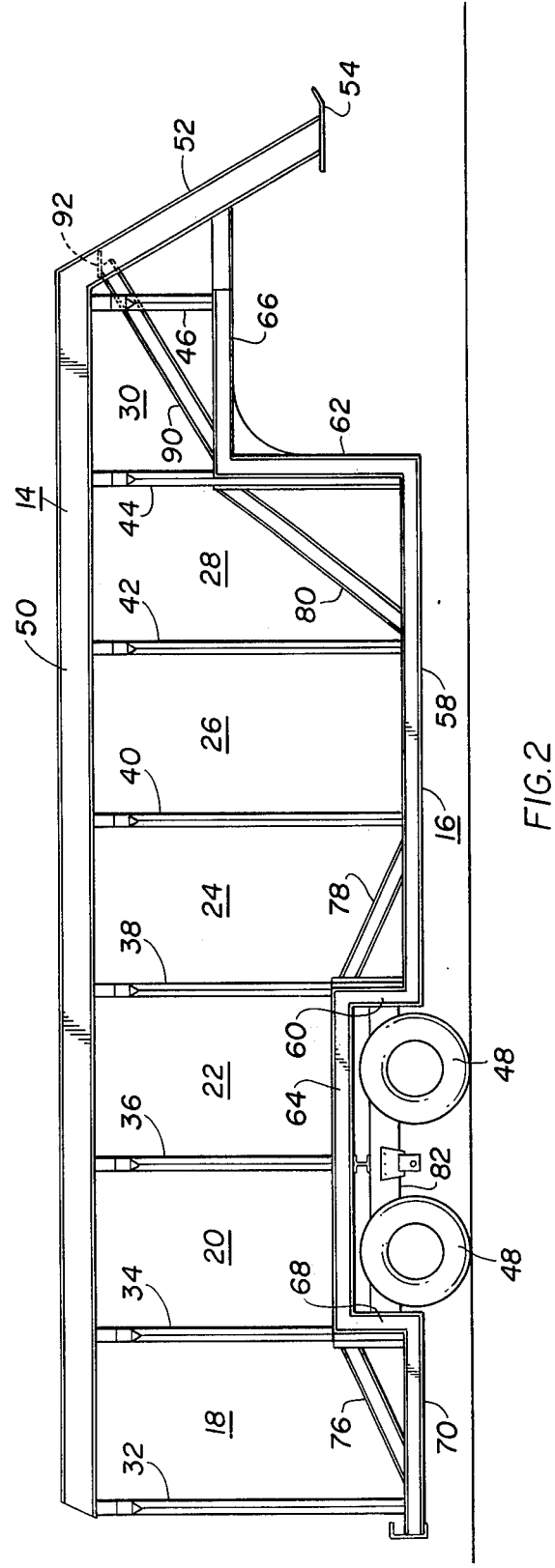

4,043,569

TRANSPORT VEHICLE

FIELD OF THE INVENTION

The present invention generally relates to transport vehicles and, more particularly, pertains to an integrally joined frame assembly for a transport vehicle wherein loads which are transported in the vehicle are supported primarily by an upper frame structure of the vehicle.

Heretofore, bulk goods such as bottle cases employed in the soft drink industry and the like have been loaded on delivery trucks or trailer bodies, frequently in palletized manner, whereby such transport vehicles are subjected to appreciable degrees of deflection as a result of the vertical load components imposed thereon.

DISCUSSION OF THE PRIOR ART

In order to alleviate stresses and deflections caused by the rather heavy loads acting on the support platform or floor members of the delivery vehicles, it has previously been proposed to suspend the loads from an upper frame structure of the vehicle which extends generally in the direction of travel of the vehicle above the spaces or bays containing the bulk loads or bottle cases.

Thus, Hummel U.S. Pat. No. 3,399,794 proposes a truck body adapted to transport bulk goods in which the goods, such as bottle cases and the like, are adapted to be suspended, while contained within cages or cases, from a longitudinally extending upper or vehicle roof frame structure which incorporates transverse structural elements for supporting the cages. Upon the cages being loaded with the goods, the upper beam structure is frequently subjected to significant deflecting loads which will cause it to assume a downwardly curved or arcuate configuration. This downward deflection will result in generating relatively high structural stresses and cause untoward displacements of the loads during the loading and travel of the vehicle.

In another earlier proposal, as disclosed in Kramer U.S. Pat. No. 3,501,195, the bulk goods are suspended through the intermediary of transverse beams from an upper structural frame member of the vehicle extending longitudinally in the direction of the vehicle. Quite similar to the structure disclosed in U.S. Pat. No. 3,399,794 any heavy loads will produce a downward deflection on the upper beam structure so as to cause the latter to assume a concavely curved or arcuate configuration which, frequently, will incline or shift the loads and cause the loading and unloading of the bulk goods to be rendered somewhat difficult while rendering the support thereof somewhat unsure.

In addition to the foregoing, the above-mentioned patents are subject to the limitation in that substantially the major proportion of the forces and stresses which are generated by the loads act on a single upper frame structure of the vehicle so as to generate maximum bending stresses at approximately the center of the upper frame structure span. This, of necessity, will either limit the extent of loading to which the upper beam structure can be subjected or, alternatively, require the utilization of extremely heavy and bulky structural components in forming the structure.

Particularly in the soft drink industry in which the transport of cases of packaged or crated materials, such as soft drinks, requires the need for maintaining different types of trunks which are capable of carrying bulky and heavy loads, it is advantageous to provide a simplified trunk body design and a frame structure therefore which will afford the conveyance of such bulk goods through the intermediary of a vehicle providing the lightest and simplest structural support frame design.

SUMMARY OF THE INVENTION

Accordingly, it is a primary object of the present invention to provide a transport vehicle of the above-mentioned type which incorporates an integrally joined load-supporting frame assembly, and which has the capability of transporting large and heavy loads without the vehicle body or structural frame being subjected to undue deformations, deflections or excessive stresses.

Another more specific object of the present invention resides in providing a transport vehicle incorporating a load-supporting frame structure in which a major proportion of the load to which the vehicle is subjected is carried by an upper frame structure and including further structure integrally joined therewith whereby the forces resulting from the loads, and any resultant stresses, are so distributed over the span of the upper frame structure as to avoid the formation of unduly high stress concentrations and deflections or deformations of the vehicle frame assembly.

Still another object of the present invention is to provide a transport vehicle incorporating an integrally joined load-supporting frame assembly, which includes a number of bays in the vehicle for receiving and storing heavy bulk goods, such as soda cases and the like common in the soft drink industry, and in which the bays are separated through the intermediary of divider members or stringers constituting components of the frame assembly, and with the divider members affording a generally uniform load and load distribution over the upper frame structure and towards a lower frame structure which is joined thereto.

The foregoing and other objects are inventively achieved in that the present invention provides for a transport vehicle for bulk goods, such as cases containing soft drinks and the like, incorporating an integrally joined load-supporting frame assembly constituted of the combination of an upper frame structure of at least one elongate beam extending in the direction of vehicle travel, with the beam having a forwardly projecting downwardly inclined portion forming a goose-neck connection to a tractive vehicle; with the upper frame structure being integrally joined to a lower frame structure which provides a platform for supporting the bulk goods; and a plurality of longitudinally spaced transversally extending divider members connecting the upper and lower frame structure so as to thereby form separate bays for receiving the bulk goods. The divider members also constitute vertical support connections between the upper and lower frame structures which will permit the loads or forces acting on the upper frame structure or the elongate beam thereof to be distributed therethrough and transmitted to the lower frame structure. This box-like integrally joined frame assembly will allow for a generally uniform stress distribution throughout the upper and lower frame structures, and will concurrently reduce or substantially eliminate any flexure and stress concentrations in the upper load-supporting frame structure or other portions of the frame assembly.

A particular advantage of the inventive integrally joined frame assembly consists of in that the various components thereof are constituted of commercially available structural members, such as channels, I-beams, angle irons and plates, thereby maintaining the cost of the frames assembly at a low and competitive level as contrasted with present transport vehicle designs.

BRIEF DESCRIPTION OF THE DRAWINGS

These and other more specific objects and advantages of the invention will become more readily apparent to one skilled in the art from the following detailed description of an exemplary embodiment of the invention, taken in conjunction with the accompanying drawings; in which:

FIG. 1 diagrammatically illustrates a side elevational view of a transport vehicle for bulk goods, such as cases of soft drinks and the like, which is constructed in conformance with the present invention;

FIG. 2 shows a side elevational view of an integrally joined load supporting frame assembly employed in the construction of the transport vehicle of FIG. 1;

DETAILED DESCRIPTION

Figure 3:
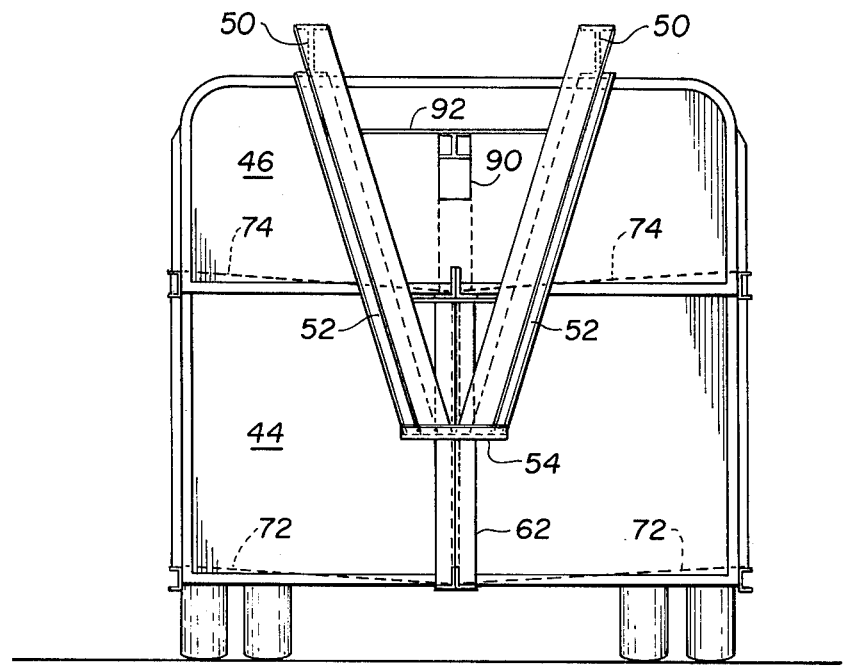
FIG. 3 is a front elevational view of the frame assembly of FIG. 2.

Referring now in detail to the drawings, FIG. 1 illustrates a transport vehicle 10 which is adapted to be coupled or hitched to a tractive vehicle 12, such as a truck cab, or half-truck and the like.

The transport vehicle 10 comprises a load-supporting frame assembly including an upper frame structure 14 which is integrally fastened to a lower frame structure 16, and with the vehicle being divided into a number of goods-receiving bays 18, 20, 22, 24, 26, 28, 30 through the intermediary of divider members 32, 34, 36, 38, 40, 42, 44 and 46 which interconnect the upper and lower frame structure. Suitable ground engaging wheels 48 supporting the rear portion of vehicle 10 are adapted to have their axles mounted on the lower frame structure 16. The frame structures 14, 16 and divider members 32 to 46 are described hereinbelow in greater detail with reference to FIGS. 2 through 7 of the drawings.

Figure 4:
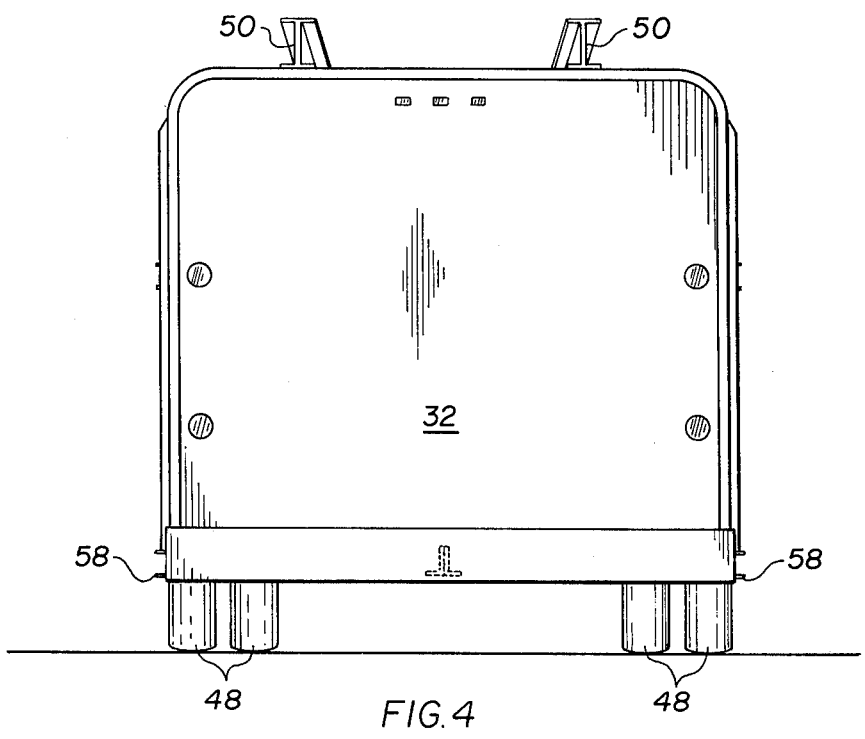
FIG. 4 is a rear elevational view of the frame assembly of FIG. 2.

As shown in FIGS. 2 through 4 of the drawings, the upper frame structure 14 of the transport vehicle 10 includes a pair of parallel spaced I-beams 50 extending in the direction of travel of the vehicle and straddling the longitudinal axial centerline of the latter. Fastened to the front ends of beams 50 are forwardly projecting and downwardly inclined I-beams 52, the latter of which converge in a V-shape and are joined at their apex by a horizontal plate 54. Suitable coupling means, such as a pivot connection (not shown), may communicate with the plate 54 for coupling the upper frame structure 14 to the tractive vehicle 12, and thereby form a so-called "gooseneck" connection between vehicles 10 and 12. Employing this type of vehicle connection, rather than a hitch, will avoid jack-knifing when backing up, and will also reduce any "sidewinding" or slewing of vehicle 10 during forward motion thereof. The leading edge of plate 54 may be bent slightly upwardly in order to facilitate sliding engagement with any coupling means which may be provided on the tractive vehicle 12.

Figure 5:
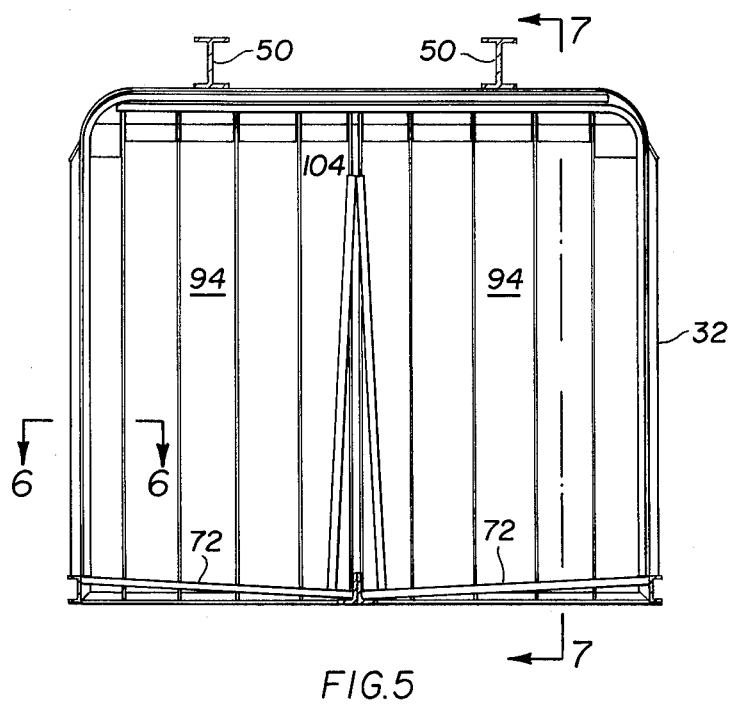
FIG. 5 is a front elevational view of a divider member or stringer adapted to be utilized in the frame assembly of FIG. 2.

The lower frame structure 16 is basically constituted of a number of joined structural elements, such as channels or angle irons, which are profiled or contoured so as to assume the general configuration of the undercarriage of a vehicle. Thus, the lower frame structure 16 may consist of parallel spaced beams 58 which are located on each respective side of the transport vehicle 10, having upstanding structural components 60 and 62 provided at opposite ends thereof and connected to respective horizontal structural elements 64 and 66. A supporting floor structure, as shown in FIG. 5, may be constructed of a plurality of contiguously arranged channel members.

Structural element 64 has a vertically depending structural element 68 fastened thereto, which connects with a horizontal structural element 70 extending towards the rear end of transport vehicle 10. As shown in FIG. 2 of the drawings, floor plates 72 and 74, which slope slightly inwardly towards the center of the transport vehicle, are supported on the lower frame structure 16 so as to be able to support various pallets or crates containing goods which are to be transported in the vehicle. Suitably inclined stiffener members, which may also be constituted of I-beams or similar structural elements, are provided along and transverse of the longitudinal axial centerline of the transport vehicle 10 to thereby rigidly interconnect the various structural elements of the lower frame structure 16 and to restrain deflection thereof upon loading of the vehicle. These elements are identified by references numerals 76, 78 and 80. Additionally, a shaped beam 90 extends between inclined I-beams 52, being fastened to the latter by means of a transversely arranged plate 92, and a crossmember interconnecting beams 66 and 62 on both sides of the vehicle. Beam 90 is located along the central longitudinal axis of the vehicle and, in conjunction with structural elements 80, 66 and 52, constitutes an A-frame arrangement for transmitting the loads to the beams 50. The structural elements 76, 78, 80 and 90 may be covered by upright wall structures (not shown) which extend proximate the centerline of the vehicle so as to divide the latter into right and left-hand cargo-supporting bays.

Support brackets and structure 82 may be provided below the lower frame structure 16 in the space defined between structural components 60, 64 and 68 for mounting of the axles for ground-engaging wheels 84, the latter of which support the rear portion of the transport vehicle 12, the front portion thereof being supported on the tractive vehicle 12 through intermediary of the beams 52 and plate 54 forming a "gooseneck" connection.

It is readily apparent that the lower frame structure 16 may have the longitudinally extending structural beams thereof interconnected by transversely extending structural members, the latter of which will also provide support for the various floor portions constituted by plates 72, 74.

Figure 6:
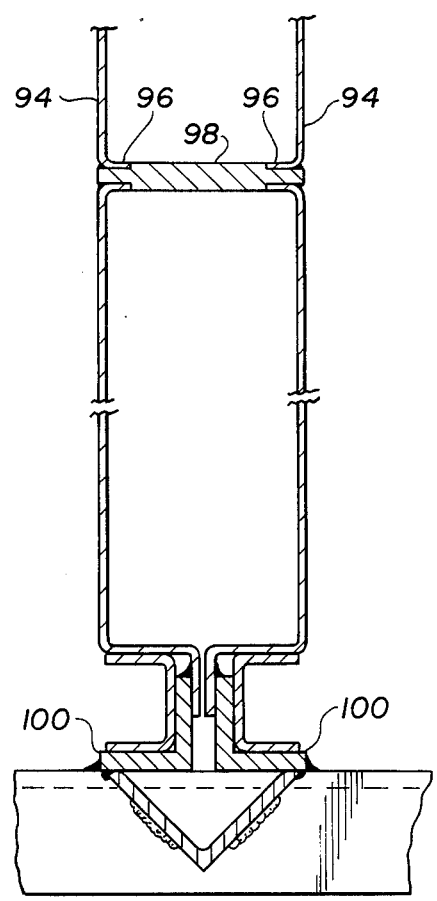
FIG. 6 is a sectional view taken along line 6—6 in FIG. 5, shown on an enlarged scale.
Figure 7:
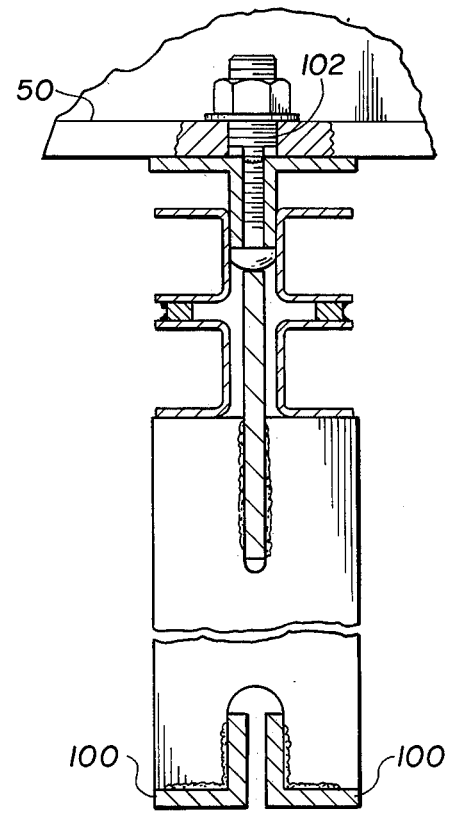
FIG. 7 is a sectional view, on an enlarged scale, taken along line 7—7 in FIG. 5.

The transport vehicle 10 is divided into separate goods-receiving bays through the utilization of the dividing members or stringers 32 through 46, as shown in greater detail in FIGS. 5 through 7 of the drawings.

Each of the divider members is essentially constituted of an inverted U-shaped frame, which may consist of angle irons. Interposed within the frame is a plate structure which may consist of individual panels, and which extend from the upper region of the U-shaped frame downwardly to the floor plate 72 or 74 on the lower frame structure 16. Essentially, the construction of each of the divider members may be in the form of a hollow partition structure, as shown and described in applicants' copending U.S. patent application No.

Basically, the hollow partition structure incorporates two parallel spaced rows of channel-shaped elements 94 having their flanges 96 facing each other. Interposed between the rows of elements 94 and the adjoining flanges 96 thereof are transversely extending spacers 98, preferably formed of extruded aluminum. The spacers 98 are rectangular in cross-section and have set-back end portions forming recessed surfaces for engaging the flanges 96 of the elements 94 in cooperative mating engagement. The elements 94 and spacers 98 may be suitably spot-welded together to form a rigid, box-like structure.

Referring to FIGS. 6 and 7 of the drawings, each inverted U-frame may consist of a plurality of angle members 100 which are located in a spaced back-to-back relationship having the panels interposed therebetween, and which may be rigidly interconnected through suitable welding procedures.

The divider members may, of course, be made in different heights, dependent upon the vertical distances between the upper and lower frame structures 14 and 16 at the particular axial or longitudinal location in the transport vehicles wherein the divider members are to be installed.

As shown in FIG. 7, suitable bolts 102 may be provided at the upper ends of the divider members, having recessed diameter portions for facilitating movement of vehicle sliding doors (not shown). The upper ends of the bolts may be fastened to the beam structure 50.

In order to impart a slope to the floor structure of the vehicle towards the center of the latter to thereby inhibit loads from sliding out of the vehicle, a tapered A-frame-like structure 104 may be provided at the vertical centerline of each divider member.

Preferably, although not necessarily, the elements 94 may be formed of 0.040 inch sheet gauge aluminum, while the floor structure is formed of 0.080 inch sheet gauge plate.

As may be readily ascertained, the interposition between the upper and lower frame structures of the longitudinally spaced divider members, as shown in FIG. 2 of the drawings, will provide for a rigid box-like interconnection between the upper and lower frame structures 14 and 16 so as to impart a high degree of rigidity and stability to the vehicle frame and to thereby prevent stress and load concentration and undue deflections when the vehicle is loaded with goods.

Although the transport vehicle 10 is illustrated as having a twelve-bay construction, in effect, six full-sized goods-receiving bays on either side of its longitudinal centerline, it is readily inherent that transport vehicles of different lengths may be constructed having differing numbers of bays provided therein for receiving the goods.

In order to reduce vehicular weight, with attendant savings in expenditures, it is possible that the divider members 32 through 46 and other parts of the frame assembly, be constituted of aluminum or other lightweight material.

The entire frame structure and divider members may, of course, be encompassed by suitable exterior panels or walls forming the exterior of the vehicle so as to enclose the goods within the transport vehicle 10 during conveyance thereof.

From the foregoing, it thus becomes quite readily apparent that the entire transport vehicle structure is of a simple and inexpensive design which will afford the greatest degree of strength and rigidity, allowing for a minimum degree of deflection or distortion during the loading of the vehicle with bulk goods, such as cases of soda, soft drinks and the like, and during the conveyance thereof.

What is claimed is:

1. In a transport vehicle, an integrally joined frame assembly comprising, in combination:
   a. an upper frame structure including at least one elongate generally horizontal beam extending in the direction of vehicle travel, said beam having a forwardly projecting and downwardly inclined portion joined to the first end thereof and conjointly forming a load-bearing backbone structure for said vehicle;
   b. a lower frame structure including at least one elongate beam extending in the direction of vehicle travel and being fastened to said downwardly inclined portion of the upper elongate beam, said elongate beam of said lower frame structure being essentially constituted of at least one structural channel member;
   c. a plurality of longitudinally spaced, transversely extending, vertical divider members being interposed between and interconnecting said upper and lower elongate beams and suspending said lower elongate beam from said upper horizontally-extending beam for forming a plurality of load-receiving bays in said vehicle;
   d. and means for supporting the forward portion of said frame assembly, and means for supporting the rearward portion of said frame assembly.

2. A frame assembly as claimed in claim 1, said upper frame structure comprising a pair of said elongate beams extending in spaced relationship on each side of the longitudinal centerline of said vehicle, said downwardly extending portion including first and second beam extensions having the first ends thereof respectively joined to said elongate beams and the lower ends thereof to each other.

3. A frame assembly as claimed in claim 2, said first and second beam extensions forming a downwardly converging V-shaped configuration.

4. A frame assembly as claimed in claim 2, said lower frame structure comprising a pair of said elongate beams extending in spaced relationship on each side of the longitudinal centerline of said vehicle, and at least one projection being provided on said elongate beams, said projection being joined to said first and second beam extensions intermediate the ends of the latter.

5. A frame assembly as claimed in claim 1, each of said divider members comprising an inverted substantially U-shaped frame, and a plate being mounted within said frame, said inverted U-shaped frame having the upper end thereof fastened to said upper frame structure and the lower ends thereof fastened to said lower frame structure.

6. A frame assembly as claimed in claim 5, said U-shaped frame being constituted of a bent structural channel member.

7. A frame assembly as claimed in claim 1, said elongate beam of said upper frame structure being essentially constituted of at least one I-beam.

8. A frame assembly as claimed in claim 1, said forward supporting means comprising coupling means for detachably connecting the forwardly projecting and downwardly inclined portion of the elongate beam of said upper frame structure to a tractive vehicle.

9. A frame assembly as claimed in claim 1, said rearward supporting means comprising ground engaging wheels connected to said lower frame structure.

* * * * *